United States Patent
Kubo

(10) Patent No.: US 10,827,085 B1
(45) Date of Patent: Nov. 3, 2020

(54) MACHINE LEARNING DEVICE, SCREEN PREDICTION DEVICE, AND CONTROLLER

(71) Applicant: FANUC CORPORATION, Yamanashi (JP)

(72) Inventor: Mamoru Kubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/815,782

(22) Filed: Mar. 11, 2020

(30) Foreign Application Priority Data

Apr. 15, 2019 (JP) ................................. 2019-076951

(51) Int. Cl.
| | | |
|---|---|---|
| G03G 15/00 | (2006.01) |
| H04N 1/00 | (2006.01) |
| G06N 20/00 | (2019.01) |
| G06F 9/30 | (2018.01) |
| G06N 3/04 | (2006.01) |
| G06K 9/62 | (2006.01) |
| G06N 3/08 | (2006.01) |

(52) U.S. Cl.
CPC ..... H04N 1/00437 (2013.01); G06F 9/30036 (2013.01); G06K 9/6256 (2013.01); G06N 3/0445 (2013.01); G06N 3/08 (2013.01); G06N 20/00 (2019.01)

(58) Field of Classification Search
CPC .. H04N 1/00437; G06N 20/00; G06N 3/0445; G06N 3/08; G06F 9/30036; G06K 9/6256; G05B 19/4155
See application file for complete search history.

(56) References Cited

U.S. PATENT DOCUMENTS

2017/0228644 A1* 8/2017 Kurokawa ......... G05B 19/4155

FOREIGN PATENT DOCUMENTS

| JP | 2017-138881 | 8/2017 |
|---|---|---|
| JP | 6290835 | 3/2018 |

* cited by examiner

*Primary Examiner* — Hoang X Ngo
(74) *Attorney, Agent, or Firm* — Wenderoth, Lind & Ponack, L.L.P.

(57) ABSTRACT

A machine learning device includes: a state observation unit that acquires a state vector sequence as a group of state vectors corresponding to a transition of operation screens responsive to a series of operations or change in a machine state; a training data acquisition unit that acquires training data containing input data and label data; and a learning unit that performs supervised machine learning using the training data to generate a learned model for predicting screen type data to be used next or on an occasion after the next by a user.

8 Claims, 10 Drawing Sheets

MACHINE LEARNING DEVICE, SCREEN PREDICTION DEVICE, AND CONTROLLER

This application is based on and claims the benefit of priority from Japanese Patent Application. No. 2019-076954, filed on 15 Apr. 2019, the content of which is incorporated herein by reference.

BACKGROUND OF THE INVENTION

Field of the Invention

The present invention relates to a machine learning device, a screen prediction device, and a controller.

Related Art

In a numerical controller for controlling a machine tool, as a result of an increasing number of functions to be added, the quantity of information to be displayed on an output device such as a liquid crystal display is increasing and types of operation screens are also increasing correspondingly. This necessitates a user to make screen switching frequently. Increase in switching time causes adverse effect on the productivity of the user at the site.

In this regard, the numerical controller encourages increase in speed of screen switching by loading all pieces of screen data about operation screens to be used in screen display process into a memory such as a random access memory (RAM) at the time of start-up of the device.

As a result of an increased number of functions of an operation screen itself, however, the data size of the operation screen increases to extend the start-up time of the controller. This unintentionally causes time of waiting for powering off and on during machine adjustment, for example, causing a problem of reduced productivity during the machine adjustment. Additionally, as screen data about an operation screen never to be used is loaded, shortage of a memory allocated to screen data occurs with a high likelihood.

In this regard, according to a known method of reducing the volume of data about an operation screen to be loaded, if the operation screen is a multi-window screen, screen data about a child window is loaded in advance at the time of display of a parent window. According to another method also known employed for purposes such as computer games, at the time when certain work has been finished, screen data about a next operation screen defined in a program is loaded in preparation for start of next work.

Further, according to a known technique of machine learning, on the basis of state data containing information about a machining state during machining and information indicating selected menu items, the order of displaying the menu items in a menu display is determined. According to another known technique of machine learning, an operator is detected, and display of an operation menu based on information about the detected operator is learned. See patent documents 1 and 2, for example.

Patent Document 1: Japanese Patent No. 6290835
Patent Document 2: Japanese Unexamined Patent Application, Publication No. 2017-138881

SUMMARY OF THE INVENTION

Each of operation screens is expected to be used for its purpose. For example, the operation screens can be allocated separately to states such as "manual operation," "editing operation," "automatic operation," "alarm occurred," etc. However, states are switched dynamically: for example, from "manual operation" to "automatic operation," or from "manual operation" or "automatic operation" to "alarm occurred." Namely, operation screen switching depends on the state of a machine tool. Operation screen switching further depends on machine design relating to display or operation, or a rule of running a machine tool at each factory, for example. Hence, it is difficult in some cases to determine the order of displaying operation screens in advance.

Hence, to limit to-be-loaded data in advance about a target operation screen to reduce the volume of the data to be loaded about the operation screen, predicting an operation screen to be used by a user in performing a series of operations has been desired.

(1) One aspect of a machine learning device according to this disclosure includes: a state observation unit that acquires a state vector sequence $\{x_n: n$ is equal to or greater than $1\}$ that is time-series data as a group of state vectors $x_n$ corresponding to a transition of operation screens responsive to a series of operations by a user or change in a machine state of an industrial machine, the state vectors $x_n$ each containing screen type data $y_n$ and machine state data $z_n$, the screen type data $y_n$ indicating a screen type of each operation screen used by the user when the user performs the series of operations on the basis of an operation screen displayed on a display unit of a controller for controlling the industrial machine, the machine state data $z_n$ indicating the machine state of the industrial machine controlled by the controller when the operation screen is displayed; a training data acquisition unit that acquires training data containing input data and label data, the input data being a subsequence of preset N (N is equal to or greater than 2) consecutive state vectors $\{x_n, x_{n+1}, \ldots x_{n+N-1}\}$ Starting from an arbitrary state vector $x_n$ (n is equal to or greater than 1) belonging to the state vector sequence acquired by the state observation unit, the label data being screen type data about a screen to be displayed next or on an occasion after the next to the operation screen containing screen type data $y_{n+N-1}$ indicating the type of a screen to be displayed next to an operation screen corresponding to a state vector $x_{n+N-1}$ at the end of the state vector subsequence as the input data; and a learning unit that performs supervised machine learning using the training data containing the input data and the label data, when the user performs a series of operations on the basis of an operation screen displayed on the display unit, the learning unit generating a learned model for predicting screen type data to be used next or on an occasion after the next by the user on the basis of a state vector subsequence containing N consecutive state vectors determined retrospectively starting from a current state vector.

(2) One aspect of a screen prediction device according to this disclosure includes: a state acquisition unit that acquires a state vector subsequence $\{x_{n-N+1}, \ldots x_n\}$ containing N consecutive state vectors determined retrospectively starting from a current state vector $x_n$ (n is equal to or greater than N) relating to an operation screen responsive to a series of operations by a user; and a prediction unit, on the basis of the learned model generated by the machine learning device described in (1), the prediction unit predicting screen type data about an operation screen to be used next or on an occasion after the next by the user using the state vector subsequence $\{x_{n-N+1}, \ldots x_n\}$ acquired by the state acquisition unit.

(3) One aspect of the screen prediction device described in (2) includes the machine learning device described in (1).

(4) One aspect of a controller according to this disclosure includes the screen prediction device described in. (2) or (3).

According to one aspect, by predicting an operation screen to be used a user in performing a series of operations and limiting to-be-loaded data in advance about a target operation screen to data about the predicted operation screen, it becomes possible to reduce the volume of the data about the operation screen to be loaded.

DETAILED DESCRIPTION OF THE INVENTION

One embodiment will be described next using the drawings.

One Embodiment

Figure 1:
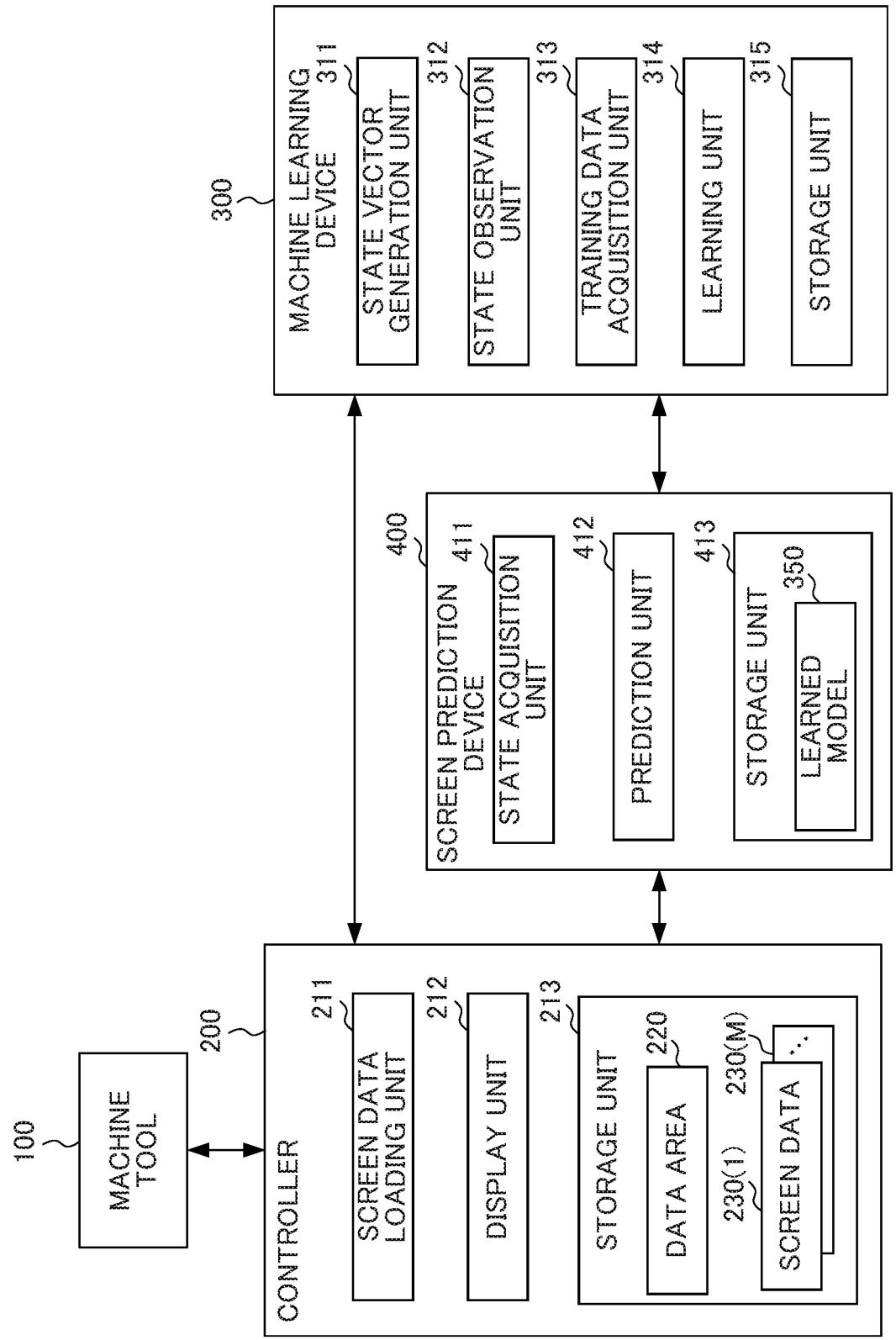
FIG. 1 is a functional block diagram showing an exemplary functional configuration of a numerical control system according to one embodiment.

FIG. 1 is a functional block diagram showing an exemplary functional configuration of a numerical control system according to the one embodiment. As shown in FIG. 1, the numerical control system includes a machine tool 100, a controller 200, a machine learning device 300, and a screen prediction device 400.

The machine tool 100, the controller 200, the machine learning device 300, and the screen prediction device 400 may directly be connected to each other through a connection interface not shown. Alternatively, the machine tool 100, the controller 200, the machine learning device 300, and the screen prediction device 400 may be connected to each other through a network not shown such as a local area network (LAN) or the Internet.

The machine tool 100 is a machine for machining to operate according to numerical control by the controller 200. The machine tool 100 feeds information indicating a state of motion based on a motion command from the controller 200 back to the controller 200.

The applicability of the embodiment is not limited to the machine tool 100 but the embodiment is applicable widely to every type of industrial machine. The industrial machine includes various machines such as machine tools, industrial robots, service robots, forge rolling machines, and injection molding machines, for example.

The controller 200 is a numerical controller publicly known to a person in this field of art and used for controlling the motion of the machine tool 100. If the machine tool 100 is a robot, the controller 200 may be a robot controller, for example.

In the following description, the state of the machine tool 100 controlled by the controller 200 will also be called a "machine state" simply.

The screen prediction device 400 is a computer device, for example. The screen prediction device 400 acquires a state vector subsequence containing N (N is equal to or greater than 2) consecutive state vectors preset retrospectively starting from a current state vector corresponding to a transition of operation screens responsive to a series of operations by a user or change in a machine state. The screen prediction device 400 inputs the acquired state vector subsequence to a learned model generated by the machine learning device 300 described later to predict screen type data about an operation screen to be used next or on an occasion after the next by the user. Then, the screen prediction device 400 outputs a result of the prediction to the controller 200.

As a result, the controller 200 is caused to load only the screen data about the operation screen indicated by the screen type data and to be used next or on an occasion after the next predicted by the screen prediction device 400 to allow reduction in the volume of data about an operation screen loaded in advance.

Machine learning for generating a learned model will be described before description of the screen prediction device 400.

<Controller 200 in Learning Phase>

In a learning phase, the controller 200 collects teacher data to be required for implementation of machine learning. For this purpose, when a user performs a series of operations on the basis of an operation screen displayed on a display unit 212, the controller 200 acquires data containing screen type data indicating a screen type of each operation screen used by the user and machine state data indicating a machine state at the time when the operation screen is displayed, and defines the acquired data as a state vector. The controller 200 stores the acquired state vector, and outputs the acquired state vector to the machine learning device 300 through a communication unit not shown.

The controller 200 in the learning phase includes the display unit 212 and a storage unit 213.

The display unit 212 is a liquid crystal display, for example, and displays an operation screen in response to an operation by the user.

The storage unit 213 is a solid state drive (SSD) or a hard disk drive (HDD), for example.

The storage unit 213 has a data area 220 in which screen type data indicating a screen type of each operation screen used by the user and machine state data indicating a machine state at the time when the operation screen is displayed are stored. The storage unit 213 stores screen data pieces 230(1) to 230(M) (M is an integer equal to or greater than 2) about M operation screens.

<Machine Learning Device 300>

The machine learning device 300 acquires screen type data and machine state data stored in the storage unit 213 of the controller 200 through a communication unit not shown, for example. For example, the machine learning device 300 may combine the acquired screen type data and machine state data to generate state vectors expressed in a one-hot format. The machine learning device 300 may acquire a group of state vectors belonging to the generated state vectors and corresponding to a transition of operation screens responsive to a series of operations by a user or change in a machine state, and define the acquired group as a state vector sequence, which is time-series data.

The machine learning device 300 may acquire a subsequence of N (N is equal to or greater than 2) consecutive state vectors starting from an arbitrary state vector contained in the state vector sequence, and define the acquired state vector subsequence as input data. The machine learning device 300 may acquire screen type data about an operation screen to be displayed next or on an occasion after the next containing screen type data indicating the type of an operation screen to be displayed next to an operation screen corresponding to a state vector at the end of the state vector subsequence as the acquired input data, and define the acquired screen type data as label data.

The machine learning device 300 may perform supervised machine learning using training data containing the acquired input data and label data. When the user performs a series of operations on the basis of an operation screen displayed on the display unit 212, the machine learning device 300 may generate a learned model for predicting screen type data to be used next or on an occasion after the next by the user on the basis of a state vector subsequence containing N consecutive state vectors determined retrospectively starting from a current state vector.

In this way, the machine learning device 300 can provide a learned model 350 to the screen prediction device 400.

The machine learning device 300 will be described specifically.

In a case described below, unless otherwise specified, "N" is "3," and screen type data to be predicted is screen type data to be used "next" by a user. Alternatively, "N" may be 2, or equal to or greater than 4. The screen prediction device 400 may predict screen type data to be used next or on an occasion after the next by the user (including screen type data to be used next, second screen type data to be used after the next screen type data, or third screen type data to be used after the second screen type data, for example).

The learning process by the machine learning device 300 may be performed as a background task or by a subprocessor, for example, when the user performs a series of operations or when a machine state changes.

As shown in FIG. 1, the machine learning device 300 includes a state vector generation unit 311, a state observation unit 312, a training data acquisition unit 313, a learning unit 314, and a storage unit 315.

The state vector generation unit 311 acquires screen type data $y_n$ and machine state data $z_n$ in the learning phase from the controller 200 through a communication unit not shown. The state vector generation unit 311 combines the acquired screen type data $y_n$ and machine state data $z_n$ to generate state vectors $x_n$ expressed in a one-hot format, as described later.

The state observation unit 312 acquires a group of the state vectors $x_n$ belonging to the generated state vectors $x_n$ and corresponding to a transition of operation screens responsive to a series of operations by a user or change in a machine state, and defines the acquired group as a state vector sequence $\{x_n: n$ is equal to or greater than $1\}$, which is time-series data. The state observation unit 312 outputs the acquired state vector sequence to the training data acquisition unit 313 and the storage unit 315.

Figure 2:
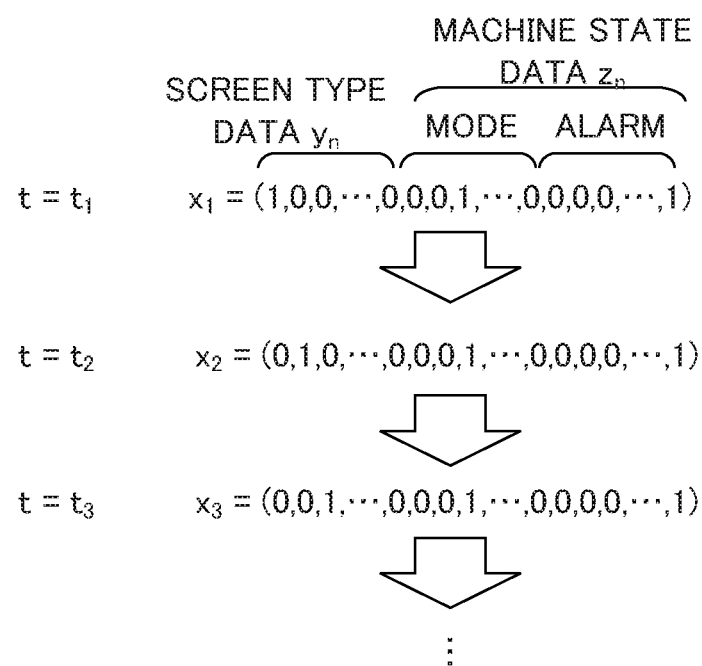
FIG. 2 shows exemplary state vectors contained in a state vector sequence.

FIG. 2 shows exemplary state vectors $x_n$ contained in the state vector sequence. As shown in FIG. 2, state vectors such as $x_1$, $x_2$, and $x_3$ have components of screen type data $y_n$ about an operation screen used by a user and machine state data $z_n$ determined at times such as $t_1$, $t_2$, and $t_3$ by operations by the user or change in a machine state. Further, the machine state data $z_n$ in each of the state vectors such as $x_1$, $x_2$, and $x_3$ has a component of a mode and a component of an alarm described later.

The screen type data $y_n$ has various types prepared for corresponding states such as "manual operation," "editing operation," "automatic operation," and "alarm occurred." In the case of "manual operation," for example, operation screens including the following are prepared: "MDI program" for inputting a temporary short NC program; "measurement" for measuring the size of a workpiece or a tool; "tool offset" for setting a distance from a tool center point to a tool nose; and "workpiece origin offset" for setting a distance from a machine origin to a workpiece origin. In the case of "editing operation," operation screens including the following are prepared, for example: "program editing" for editing an NC program for automatic operation; and "cutting simulation" for executing an NC program while keeping a machine suspended and graphically drawing a tool path and a workpiece geometry. In the case of "automatic operation," operation screens including the following are prepared, for example: "tool position display" for displaying the coordinate of a tool position; "program check" for displaying the content of an NC program being executed; "drawing during machining" for graphically drawing a tool path and a workpiece geometry responsive to an NC program being executed; and "load meter" for displaying cutting load on a motor as a percentage. In the case of "alarm," operation screens including the following are prepared, for example: "diagnosis" for displaying a state inside a CNC; "parameter" for inputting various parameters for the CNC; "alarm message" for displaying an alarm message; and "alarm history" for displaying an alarm history.

"Mode" of the machine state data $z_n$ includes: "MDI" for editing and executing an MDI program and for inputting data manually; "EDIT" for enabling editing of an NC program for automatic operation; "MEM (AUTO)" for running an NC program automatically; "HANDLE" for axis feed through handle operation; "JOG" for axis feed through button operation; "REFERENCE" for reference point return; and "REMOTE (TAPP)" for executing an NC program in an external device.

"Alarm" of the machine state data $z_n$ includes: "P/S alarm" meaning error in an NC program; "overtravel alarm" meaning that an axis has moved to a degree exceeding a limit; "overheat alarm" showing an overheat state occurring in a controller or a motor; "servo alarm" meaning an alarm relating to a servo motor; "spindle motor alarm" meaning an alarm relating to a spindle motor; "external alarm" meaning an alarm defined by a device manufacturer, etc.

"Alarm" of the machine state data $z_n$ is an example of a transition of operation screens displayed on the display unit 212 on the occurrence of change in a machine state. "Alarm" may include a type of a pop-up indication for notifying scheduled maintenance or notifying software update, for example.

As will be described later, the machine state data $z_n$ may include an operation state or a signal in addition to the mode and the alarm.

As shown in FIG. 2, if an operation screen on the display unit 212 is changed from a screen "tool position display" to a screen "program check" in response to a user's operation performed at the time $t_1$ while a mode is "MDI" and an alarm is absent in a machine state, for example, a screen component "tool position display" (a first component, for example)

is set at "1" and the other operation screen components are set at "0" in screen type data $y_1$ in the state vector Hi according to a one-hot format. Regarding "anode" of machine state data $z_1$ in the state vector $x_1$, a component "MDI" (a third component, for example) is set at "1" and the other mode components are set at "0" according to a one-hot format. Regarding "alarm" of the machine state data $z_1$ in the state vector $x_1$, a component "no alarm" (the last component, for example) is set at "1" and the other alarm components are set at "0" according to a one-hot format.

If an operation screen on the display unit 212 is changed from the screen "program check" to a screen "load meter" in response to a user's operation performed at the subsequent time $t_2$ while a mode is "MDI" and an alarm is still absent, a screen component "program check" (a second component, for example) is set at "1" and the other operation screen components are set at "0" in screen type data $y_2$ in the state vector $x_2$ according to a one-hot format. Further, if an operation screen on the display unit 212 is changed from the screen "load meter" to a screen "drawing during machining" in response to a user's operation performed at the time $t_3$ while a mode is "MDI" and an alarm is still absent, a screen component "load meter" (a third component, for example) is set at "1" and the other operation screen components are set at "0" in screen type data $y_3$ in the state vector $x_3$ according to a one-hot format. Each component of the mode and that of the alarm in machine state data $z_2$ and machine state data $z_3$ in the state vectors $x_2$ and $x_3$ respectively are defined in the same way as the components of the machine state data $z_1$ in the state vector $x_1$.

The training data acquisition unit 313 acquires a subsequence of three consecutive state vectors $\{x_n, x_{n+1}, x_{n+2}\}$ contained in the acquired state vector sequence, starting from an arbitrary state vector $x_n$ (n is equal to or greater than 1), and defines the acquired subsequence as input data.

Further, the training data acquisition unit 313 acquires screen type data $y_{n+2}$ indicating the type of an operation screen to be displayed next to an operation screen corresponding to a state vector $x_{n+2}$ at the end of the state vector subsequence as the input data, and define the acquired screen type data $y_{n+2}$ as label data. The training data acquisition unit 313 outputs the acquired input data and label data to the storage unit 315.

The learning unit 314 performs supervised machine learning using the input data and the label data stored in the storage unit 315 as training data. When a user performs a series of operations on the basis of an operation screen displayed on the display unit 212, the learning unit 314 generates the learned model 350 for predicting screen type data to be used next by the user on the basis of a state vector subsequence containing three consecutive state vectors determined retrospectively starting from a current state vector.

Figure 3:
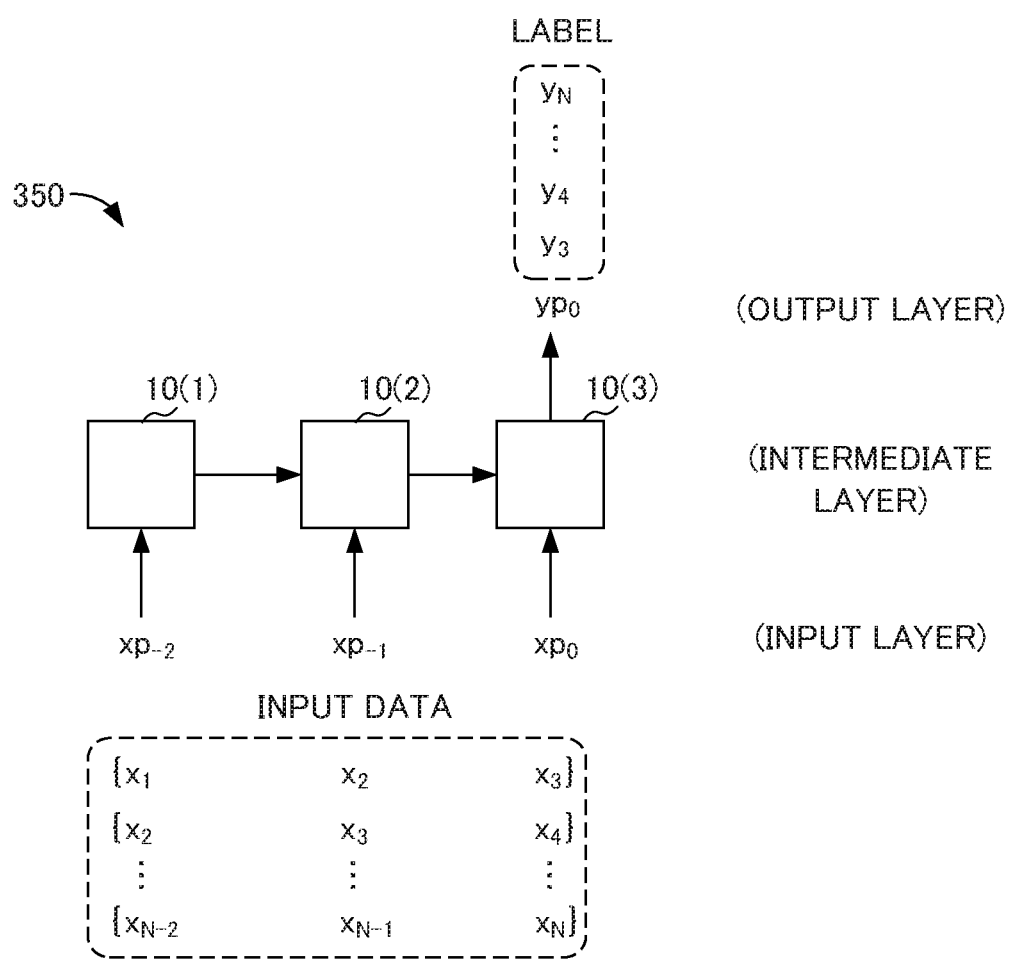
FIG. 3 explains an example of a process of generating a learned model by the machine learning device shown in FIG. 1.

FIG. 3 explains an example of a process of generating the learned model 350 by the machine learning device 300 shown in FIG. 1.

As shown in FIG. 3, for example, the learned model 350 has an input layer containing a state vector subsequence $\{xp_{-2}, xp_{-1}, xp_0\}$ including three consecutive state vectors determined retrospectively starting from a state vector $xp_0$ corresponding to current time $t_0$, an intermediate layer containing recurrent neural networks (RNNs) 10(1) to 10(3) to which the corresponding vectors in the input layer are input, and an output layer containing screen type data $yp_0$ to be used next by the user. A state vector $xp_{-1}$ shows screen type data and machine state data at the time of the latest operation screen transition. A state vector $xp_{-2}$ shows screen type data and machine state data at the time of an operation screen transition previous to the transition made while the state vector is $xp_{-1}$.

In the following, where the RNNs 10(1) to 10(3) are not required to be recognized distinctively, they will also be called an "RNN 10" collectively.

Figure 4:
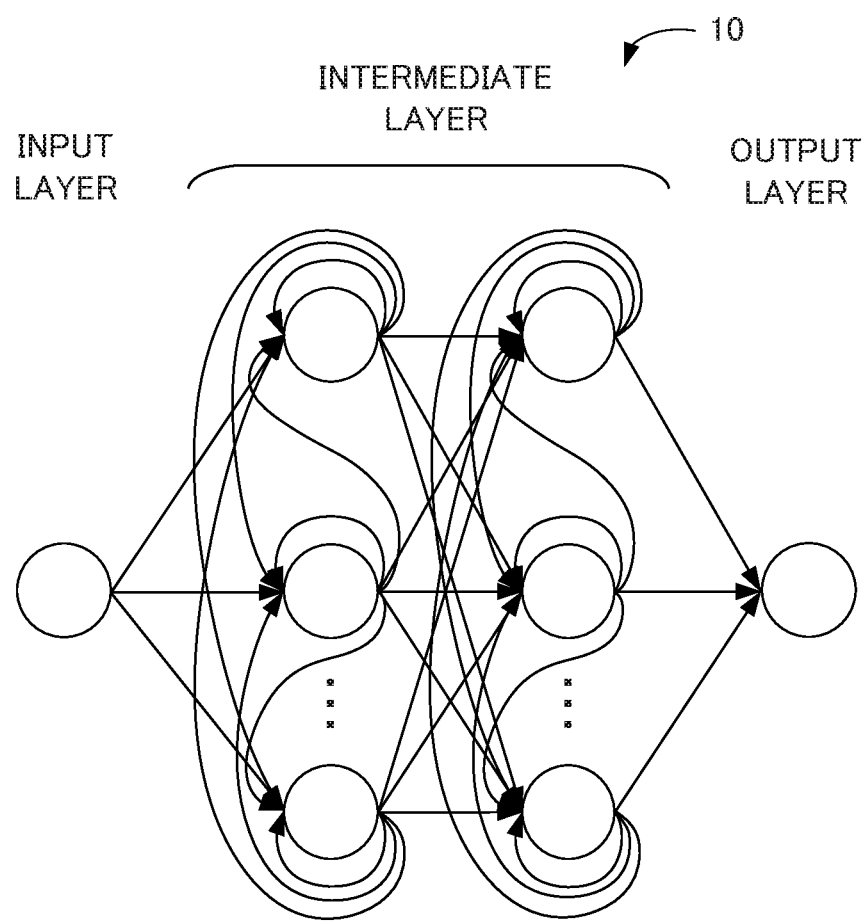
FIG. 4 schematically shows the configuration of an RHN according to the one embodiment.

FIG. 4 schematically shows the configuration of the RNN 10 according to the embodiment. As shown in FIG. 4, an output of each perceptron in the intermediate layer is input to the same perceptron and a perceptron in the same layer.

To optimize a parameter such as a weight vector for the RNN 10 of the learned model 350, the learning unit 314 accepts training data from the storage unit 315 containing state vector subsequences $\{x_1, x_2, x_3\}$, $\{x_2, x_3, x_4\}$, ... $\{x_{N-1}, x_N\}$ as input data and screen type data $y_3, y_4, \ldots y_N$ as label data. The learning unit 314 changes a state vector subsequence to $\{xp_{-2}, xp_{-1}, xp_0\}$ and changes screen type data to $yp_0$. Then, using the accepted training data, the learning unit 314 performs supervised learning according to a well-known backpropagation method, for example. By the implementation of the supervised learning, the learning unit 314 optimizes a parameter such as a weight vector for the RNN 10 to generate the learned model 350.

The learning unit 314 may perform the foregoing supervised learning as online learning, batch learning, or mini-batch learning.

The online learning is a learning method by which, each time teacher data is generated, the supervised learning is performed immediately. The batch learning is a learning method by which, while teacher data is generated repeatedly, multiple pieces of teacher data responsive to the repetitions are collected and the supervised learning is performed using all the collected pieces of teacher data. The mini-batch learning is a learning method intermediate between the online learning and the batch learning by which, each time a certain volume of teacher data is accumulated, the supervised learning is performed.

The learning unit 314 provides the optimized learned model 350 to the screen prediction device 400.

If new teacher data is acquired after generation of the learned model 350, the learning unit 314 may perform supervised learning further on the learned model 350 to update the learned model 350 after the learned model 350 is generated once.

The storage unit 315 is an SSD or a HDD, for example, and stores the state vector sequence acquired by the state observation unit 312, the input data and the label data acquired by the training data acquisition unit 313, the learned model 350 generated by the learning unit 314, etc.

The machining learning for generating the learned model 350 stored in the screen prediction device 400 is as has been described above.

The screen prediction device 400 will be described next.
<Screen Prediction Device 400>

As shown in FIG. 1, the screen prediction device 400 includes a state acquisition unit 411, a prediction unit 412, and a storage unit 413.

The state acquisition unit 411 acquires the screen type data $y_n$ and the machine state data $z_n$ from the controller 200 in a running phase. The state acquisition unit 411 combines the acquired screen type data $y_n$ and machine state data $z_n$ to generate the state vector $x_n$ expressed in a one-hot format.

The state acquisition unit 411 acquires a state vector subsequence $\{x_{n-2}, x_{n-1}, x_n\}$ containing three consecutive state vectors determined retrospectively starting from a current state vector $x_n$ relating to an operation screen responsive to a series of operations by a user, and defines the acquired state vector subsequence as a state vector subsequence $\{xp_{-2}, xp_{-1}, xp_0\}$.

On the basis of the learned model 350 stored in the storage unit 413, the prediction unit 412 predicts the screen type data $yp_0$ about an operation screen to be used next by the user using the state vector subsequence $\{xp_{-2}, xp_{-1}, xp_0\}$ acquired by the state acquisition unit 411. The prediction unit 412 outputs a result of the prediction to the controller 200.

The storage unit 413 is a RAM, for example, and stores the learned model 350 generated by the machine learning device 300.

<Controller 200 in Running Phase>

As shown in FIG. 1, the controller 200 in the running phase includes a screen data loading unit 211, the display unit 212, and the storage unit 213. The display unit 212 and the storage unit 213 have been described above in the description of the learning phase.

The screen data loading unit 211 acquires the screen type data $yp_0$ through a communication unit not shown about an operation screen to be used next by a user predicted by the screen prediction device 400. The screen data loading unit 211 loads screen data 230 about the operation screen corresponding to the acquired screen type data $yp_0$ from the storage unit 213 into a RAM not shown, for example.

If the user selects a different operation screen after loading of the screen data 230 about the operation screen corresponding to the predicted screen type data $yp_0$, the screen data loading unit 211 may load screen data 230 about the selected different operation screen from the storage unit 213, and unload the screen data 230 about the operation screen corresponding to the predicted screen type data $yp_0$ from the RAM.

<Screen Prediction Process in Numerical Control System in Running Phase>

Motion of the numerical control system according to the embodiment involved in a screen prediction process will be described next.

The prediction process by the screen prediction device 400 and the loading process by the controller 200 may be performed as background tasks or by a subprocessor, for example, when a user performs a series of operations or when a machine state changes.

Figure 5:
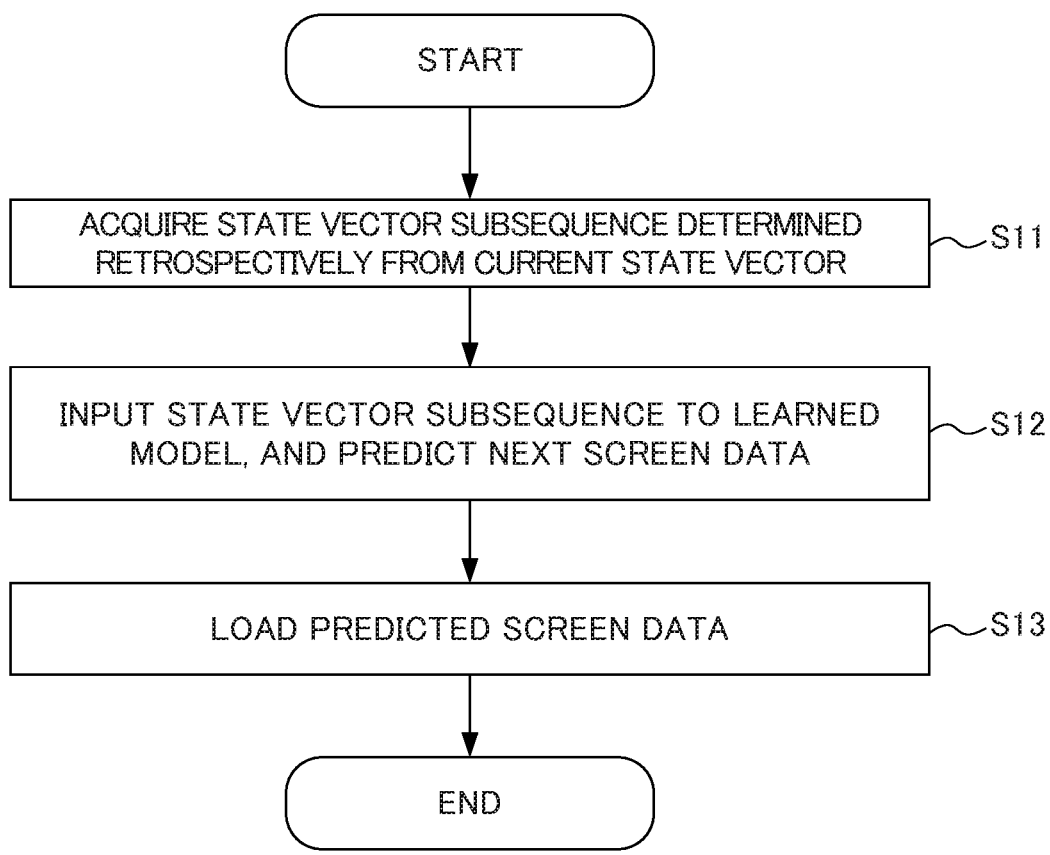
FIG. 5 is a flowchart explaining a screen prediction process performed by the numerical control system in a running phase.

FIG. 5 is a flowchart explaining the screen prediction process performed by the numerical control system in the running phase.

In step S11, on the basis of the screen type data $y_n$ and the machine state data $z_n$ acquired from the controller 200, the state acquisition unit 411 of the screen prediction device 400 acquires the state vector subsequence $\{x_{n-2}, x_{n-1}, x_n\}$ containing three consecutive state vectors determined retrospectively starting from the current state vector $x_n$, and defines the acquired state vector subsequence as the state vector subsequence $\{xp_{-2}, xp_{-1}, xp_0\}$.

In step S12, the prediction unit 412 of the screen prediction device 400 inputs the state vector subsequence $\{xp_{-2}, xp_{-1}, xp_0\}$ acquired in step S11 to the learned model 350 to predict the screen type data $yp_0$ about an operation screen to be used next by a user.

In step S13, the screen data loading unit 211 of the controller 200 loads the screen data 230 about the operation screen corresponding to the screen type data $yp_0$ predicted in step S12 from the storage unit 213 into the RAM not shown, for example.

As described above, the screen prediction device 400 according to the one embodiment inputs a state vector subsequence to the learned model 350. The input state vector subsequence contains three consecutive state vectors determined retrospectively starting from a current state vector relating to an operation screen responsive to a series of operations by a user. By doing so, it becomes possible to predict an operation screen to be used by the user at least on a next occasion while consideration is given to a flow of the series of operations by the user. In this way, the screen prediction device 400 can minimize the volume of data about an operation screen to be loaded by the controller 200. Further, the screen prediction device 400 can predict an optimum operation screen responsive to a machine state, machine design relating to display or operation, or a rule of running the machine tool 100 at each factory, for example.

While the one embodiment has been described above, the controller 200, the machine learning device 300, and the screen prediction device 400 are not limited to those described in the foregoing embodiment but modifications, improvements, etc. thereof are feasible within a range in which the purpose is attainable.

<First Modification>

While the machine learning device 300 is described as a device different from the controller 200 and the screen prediction device 400 in the example given in the foregoing embodiment, some or all of the functions of the machine learning device 300 may be provided in the controller 200 or the screen prediction device 400.

<Second Modification>

While the screen prediction device 400 is described as a device different from the controller 200 in the example given in the foregoing embodiment, some or all of the functions of the screen prediction device 400 may be provided in the controller 200.

Alternatively, some or all of the state acquisition unit 411, the prediction unit 412, and the storage unit 413 of the screen prediction device 400 may be provided in a server, for example.

Still alternatively, each function of the screen prediction device 400 may be realized using a virtual server function on a cloud, for example. Still alternatively, the screen prediction device 400 may be configured as a distributed processing system in which the functions of the screen prediction device 400 are distributed to a plurality of appropriate servers.

<Third Modification>

Figure 6:
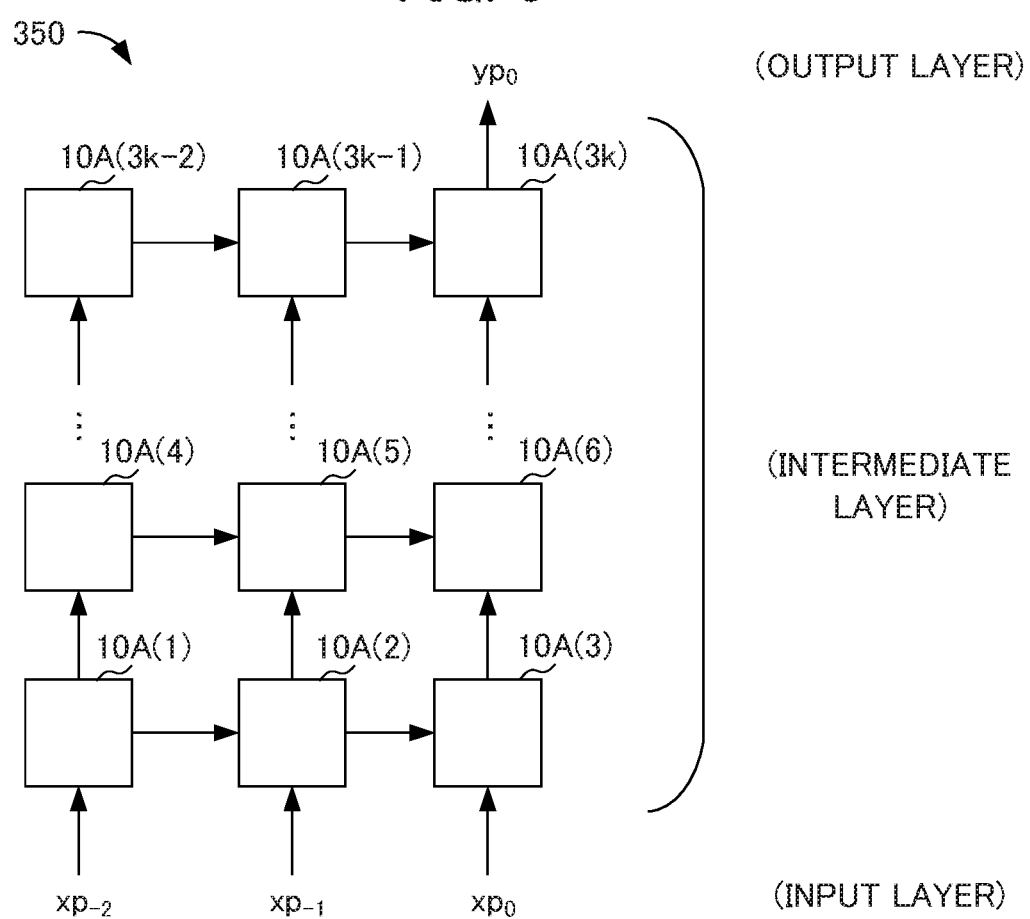
FIG. 6 shows an exemplary learned model.

In the example given in the foregoing embodiment, the intermediate layer of the learned model 350 shown in FIG. 3 is composed of one layer containing the three RNNs 10. However, this is not the only configuration. As shown in FIG. 6, the learned model 350 may be generated through deep learning having an intermediate layer configured by using RNNs 10A(1) to 10A(3k) in which three of the RNNs as one set form one layer (k is an integer equal to or greater than 2). This allows the screen prediction device 400 to grasp the features of screen type data and machine state data of a state vector in the past more correctly than in the configuration of FIG. 3 to allow prediction of screen type data about a next operation screen with a higher degree of accuracy. Each of the RNNs 10A(1) to 10A(3k) corresponds to the RNN 10 in FIG. 3.

Figure 7:
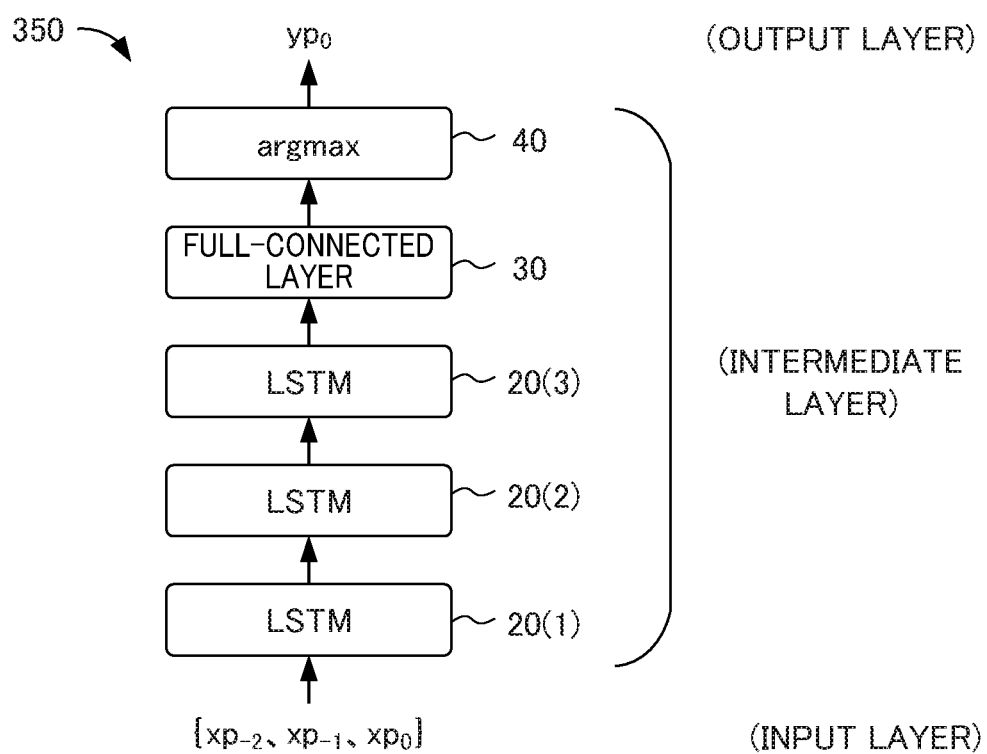
FIG. 7 shows an exemplary learned model.

Alternatively, as shown in FIG. 7, the learned model 350 may have an intermediate layer in which LSTMs (long short-term memories) 20(1) to 20(3) each being an RNN with an input gate, an output gate, and a forget gate are arranged instead of the RNNs 10(1) to 10(3) in FIG. 3. In this case, a full-connected layer 30 and an argmax 40 are arranged in the intermediate layer of the learned model 350 in addition to the LSTMs 20(1) to 20(3). The argmax 40 outputs screen type data as the screen type data $yp_0$ having the highest probability value of those of multiple pieces of screen type data output from the full-connected layer 30. This allows the screen prediction device 400 to grasp the features of screen type data and machine state data of a state vector in the past more correctly than in the configuration of FIG. 3 to allow prediction of screen type data about a next operation screen with a higher degree of accuracy. While the number of the LSTMs 20 shown in FIG. 7 is three, it may be one or greater than 1.

<Fourth Modification>

While the screen prediction device 400 preditects an operation screen to be used next by a user in the example given in the foregoing embodiment, the screen prediction device 400 may predict an operation screen to be used next or on an occasion after the next by the user.

Figure 8:
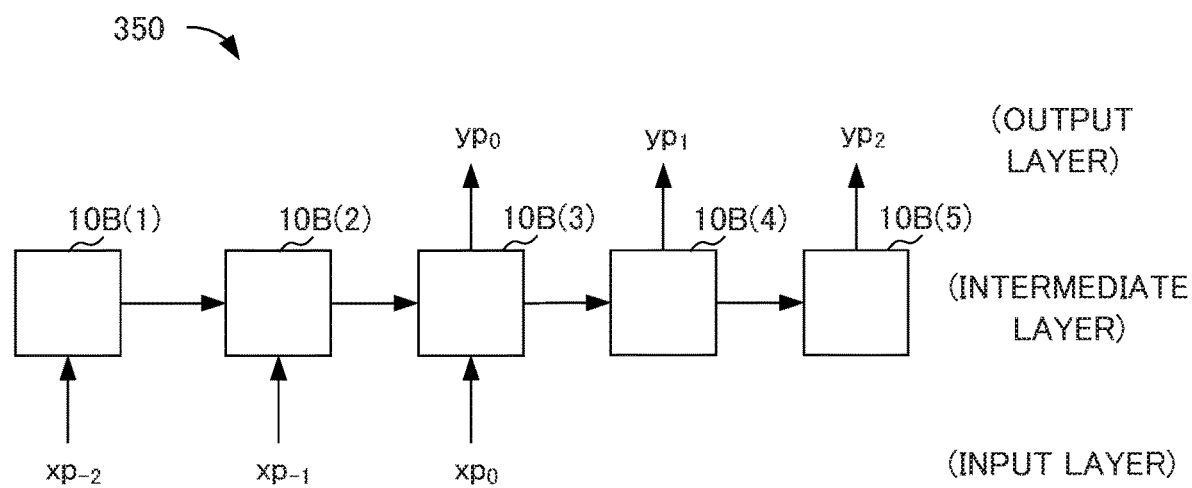
FIG. 8 shows an exemplary learned model for predicting screen type data about a next operation screen, a second operation screen after the next operation screen, and a third operation screen after the second operation screen.

FIG. 8 shows an example of the learned model 350 for predicting the screen type data $yp_0$, screen type data $yp_1$, and screen type data $yp_2$ about a next operation screen, a second operation screen after the next operation screen, and a third operation screen after the second operation screen respectively. As shown in FIG. 8, the learned model 350 has an input layer containing the state vector subsequence $\{xp_{-2}, xp_{-1}, xp_0\}$ including three consecutive state vectors determined retrospectively starting from the current state vector $xp_0$, an intermediate layer containing RNNs 10B(1) to 10B(5), and an output layer containing the screen type data $yp_0$ to be used next, the second screen type data $yp_1$ to be used after the next, and the third screen type data $yp_2$ to be used after the screen type data $yp_1$ by the user.

In this case, the machine learning device 300 accepts training data from the storage unit 315 containing the state vector subsequences $\{x_1, x_2, x_3\}$, $\{x_2, x_3, x_4\}$, ... $\{x_{N-2}, x_{N-1}, x_N\}$ as input data and screen type data $\{y_3, y_4, y_5\}$, $\{y_4, y_5, y_6\}$ ... $\{y_{N-2}, y_{N-1}, y_N\}$ as label data, and performs supervised learning.

Each of the RNNs 10B(1) to 10B(5) corresponds to the RNN 10 in FIG. 3.

<Fifth Modification>

Figure 9:
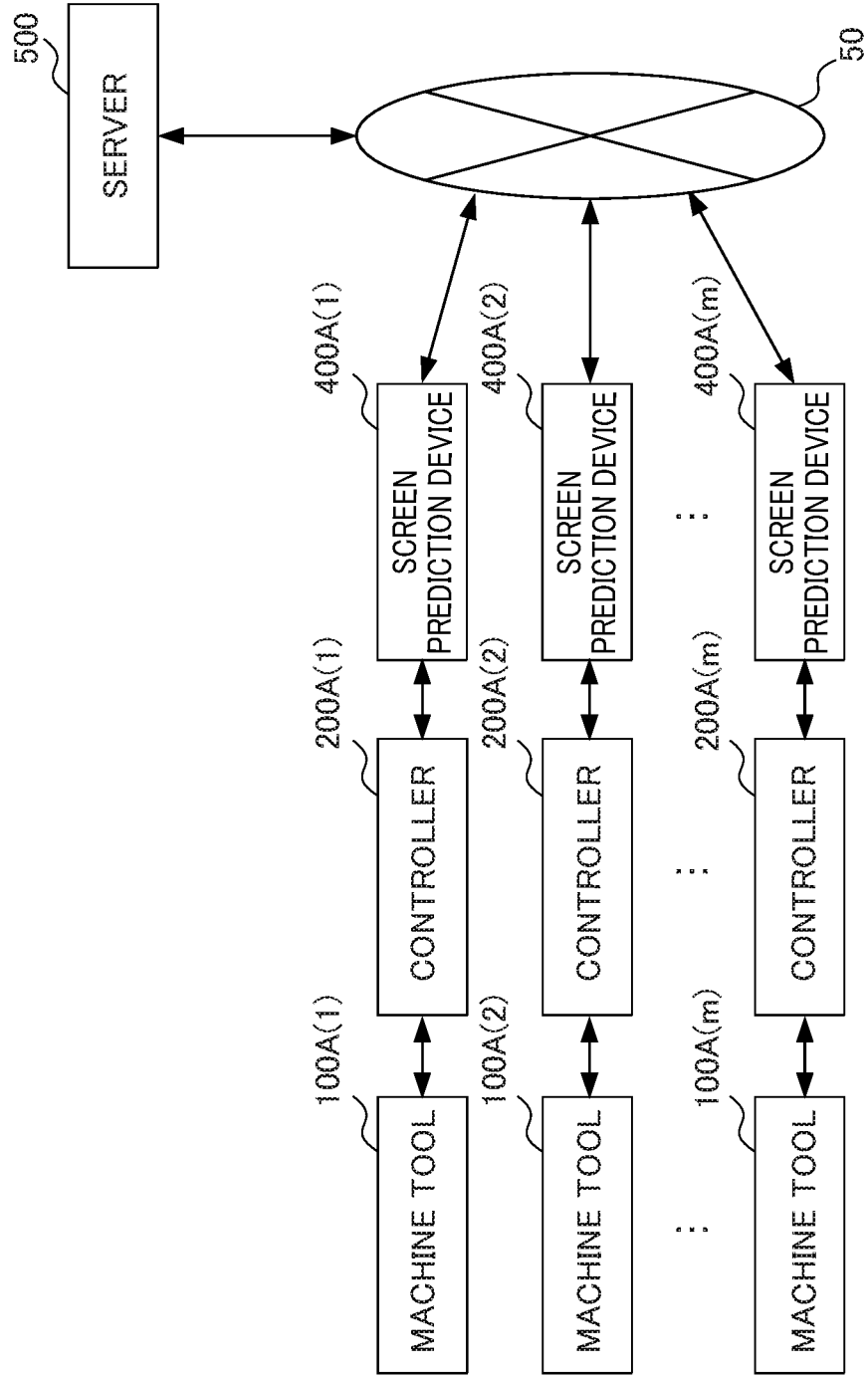
FIG. 9 shows an exemplary configuration of a numerical control system.

In the example given in the foregoing embodiment, the screen prediction device 400 predicts an operation screen to be used next by a user using the learned model 350 generated by the machine learning device 300. However, this is not the only configuration. As shown in FIG. 9, for example, the learned model 350 generated by the machine learning device 300 may be stored in a server 500, and may be shared between m screen prediction devices 400A(1) to 400A(m) (m is an integer equal to or greater than 2) connected to a network 50. This makes the learned model 350 applicable further to a machine tool, a controller, and a screen prediction device newly mounted.

The screen prediction devices 400A(1) to 400(m) are connected to controllers 200A(1) to 200A(m) respectively. The controllers 200A(1) to 200A(m) are connected to machine tools 100A(1) to 100A(m) respectively.

Each of the machine tools 100A(1) to 100A(m) corresponds to the machine tool 100 shown in FIG. 1. Each of the controllers 200A(1) to 200A(m) corresponds to the controller 200 shown in FIG. 1. Each of the screen prediction devices 400A(1) to 400(m) corresponds to the screen prediction device 400 shown in FIG. 1.

Figure 10:
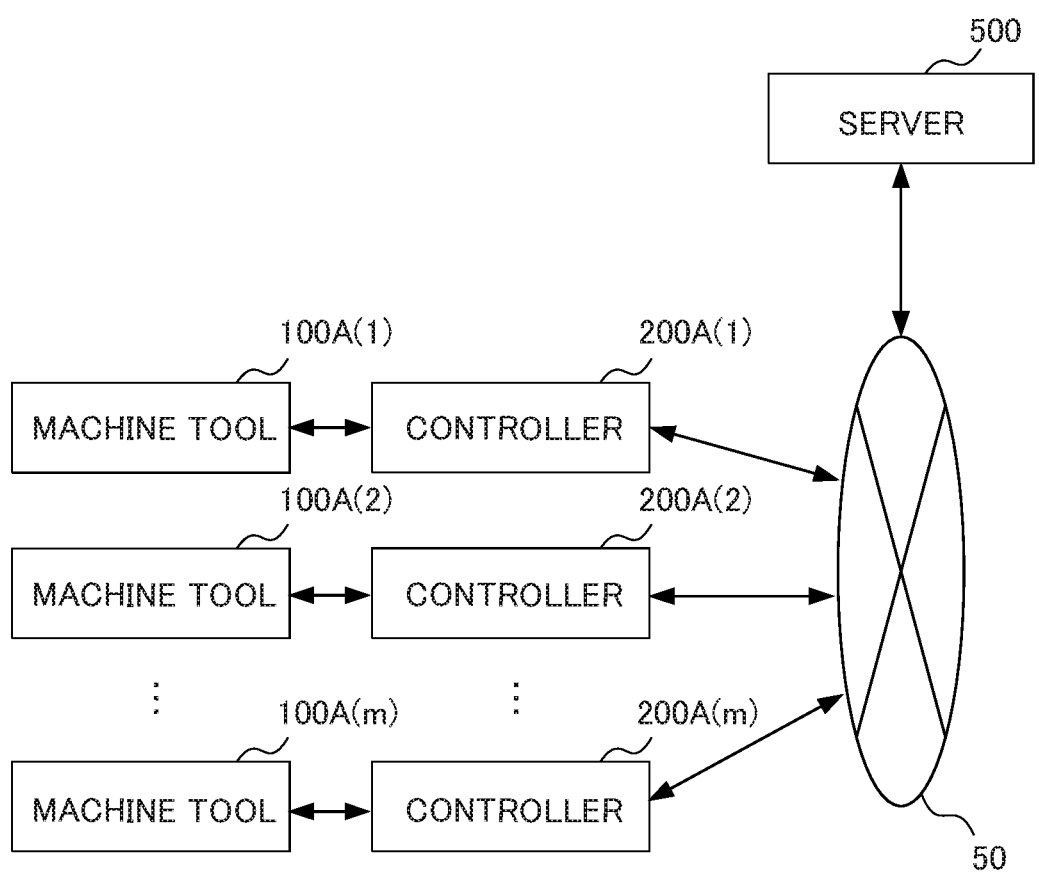
FIG. 10 shows an exemplary configuration of a numerical control system.

Alternatively, as shown in FIG. 10, the server 500 may function as the screen prediction device 400, for example, and may predict screen type data about an operation screen to be used next or on an occasion after the next by a user for each of the controllers 200A(1) to 200A(m) connected to the network 50 and placed in the same factory. This makes the learned model 350 applicable further to a machine tool and a controller newly mounted.

<Sixth Modification>

In the example given in the foregoing embodiment, while the machine state data $z_n$ has a mode and an alarm, it may have an operation state or a signal in addition to the mode and the alarm, as described above.

"Operation state" of the machine state data $z_n$ includes: "START (active state)" showing a state in which an NC program is being executed; "STOP (stopped state)" showing a state in which operation is finished and stopped; "HOLD (suspended state)" showing a state in which operation is interrupted and suspended even in the presence of a command left unexecuted; "RESET (reset state)" showing a default state or a state in which an emergency stop button or a reset button has been pressed, etc., for example.

"Signal" of the machine state data $z_n$ includes: "JOG feed axis direction select" for determining which one of axes X, Y, and Z is to be moved and for determining a direction of the move (positive or negative); "handle feed axis select" for determining which one of the axes X, Y, and Z is to be moved and for determining a direction of the move (positive or negative); "signal block" for executing one line of an NC program and then stopping the NC program, etc.

The functions of the controller 200, those of the machine learning device 300, and the screen prediction device 400 according to the one embodiment can be realized by hardware, software, or a combination of hardware and software. Being realized by software means being realized by reading and execution of a program by a computer.

Each structure unit in the controller 200 can be realized by hardware (including an electronic circuit, etc.), software, or a combination of hardware and software. To realize each structure unit by software, programs configuring the software are installed on a computer (numerical controller 1). These programs may be stored in a removable medium and then distributed to a user. Alternatively, these programs may be distributed by being downloaded to a computer of the user through a network. If hardware is used for the configuration, some of all of the foregoing functions of the structure units in the controller can be configured using an integrated circuit (IC) such as an application specific integrated circuit (ASIC), a gate array, a field programmable gate array (FPGA), or a complex programmable logic device (CPLD), for example.

The programs can be stored using various types of non-transitory computer-readable media and can be supplied to a computer. The non-transitory computer-readable media include various types of tangible storage media. Examples of the non-transitory computer-readable media include a magnetic storage medium (a flexible disk, magnetic tape, or a hard disk drive, for example), a magneto-optical storage medium (a magneto-optical disk, for example), a CD read-only memory (CD-ROM), a CD-R, a CD-R/W, and a semi-conductor memory (a mask ROM, a programmable ROM (PROM), an erasable PROM (EPROM), a flash ROM, or a RAM, for example). The programs can also be supplied to the computer using various types of transitory computer-readable media. Examples of the transitory computer-readable media include electrical signals, optical signals, and electromagnetic waves. The transitory computer-readable media can be used for supplying the programs to the computer via wired communication paths such as an electric wire and an optical fiber, or wireless communication paths.

Steps describing the programs stored in a storage medium certainly include processes to be performed in chronological order according to the order of the steps, and further include processes not to necessarily be performed in chronological order but to be performed in parallel or individually.

As another way of stating the foregoing, the machine learning device, the screen prediction device, and the controller according to this disclosure can be embodied in a wide variety of ways having the configurations as follows:

(1) The machine learning device 300 according to this disclosure includes: the state observation unit 312 that acquires the state vector sequence $\{x_n: n$ is equal to or greater than 1$\}$ that is time-series data as a group of the state vectors $x_n$ corresponding to a transition of operation screens responsive to a series of operations by a user or change in a machine state of an industrial machine (machine tool 100), the state vectors $x_n$ each containing the screen type data $y_n$ and the machine state data $z_n$, the screen type data $y_n$ indicating a screen type of each operation screen used by the user when the user performs the series of operations on the basis of an operation screen displayed on the display unit 212 of the controller 200 for controlling the industrial machine, the machine state data $z_n$ indicating the machine state of the industrial machine controlled by the controller 200 when the operation screen is displayed; the training data acquisition unit 313 that acquires training data containing input data and label data, the input data being a subsequence of preset N (N is equal to or greater than 2) consecutive state vectors $\{x_n, x_{n+1}, \ldots x_{n+N-1}\}$ starting from the arbitrary state vector $x_n$ (n is equal to or greater than 1) belonging to the state vector sequence acquired by the state observation unit 312, the label data being screen type data about a screen to be displayed next or on an occasion after the next to the operation screen containing screen type data $y_{n+N-1}$ indicating the type of a screen to be displayed next to an operation screen corresponding to a state vector $x_{n+N-1}$ at the end of the state vector subsequence as the input data; and the learning unit 314 that performs supervised machine learning using the training data containing the input data and the label data. When the user performs a series of operations on the basis of an operation screen displayed on the display unit 212, the learning unit 314 generates the learned model 350 for predicting screen type data to be used next or on an occasion after the next by the user on the basis of a state vector subsequence containing N consecutive state vectors determined retrospectively starting from a current state vector.

The machine learning device 300 predicts an operation screen to be used next or on an occasion after the next by the user, and limits data about a target operation screen to be loaded by the controller 200 to data about the predicted operation screen, making it possible to generate the learned model 350 for minimizing the volume of data about a screen to be loaded.

(2) The learning unit 314 may perform machine learning on a flow of the series of operations using a recurrent neural network (RNN 10).

This allows the machine learning device 300 to generate the learned model 350 usable for predicting screen type data about an operation screen to be used next or on an occasion after the next by the user in response to a flow of the series of operations.

(3) An LSTM 20 as an RNN with an input gate, an output gate, and a forget gate may be used as the recurrent neural network.

This allows the machine learning device 300 to generate the learned model 350 usable for predicting screen type data about an operation screen with a higher degree of accuracy to be used next or on an occasion after the next by the user.

(4) The screen prediction device 400 according to this disclosure includes: the state acquisition unit 411 that acquires a state vector subsequence $\{x_{n-N+1}, \ldots x_n\}$ containing N consecutive state vectors determined retrospectively starting from a current state vector $x_n$ (n is equal to or greater than N) relating to an operation screen responsive to a series of operations by a user; and the prediction unit 412. On the basis of the learned model 350 generated by the machine learning device 300, the prediction unit 412 predicts screen type data about an operation screen to be used next or on an occasion after the next by the user using the state vector subsequence $\{x_{n-N+1}, \ldots x_n\}$ acquired by the state acquisition unit 411.

The screen prediction device 400 predicts an operation screen to be used next or on an occasion after the next by the user, and limits data about a target operation screen to be loaded by the controller 200 to data about the predicted operation screen, making it possible to minimize the volume of data about a screen to be loaded.

(5) The screen prediction device 400 described in (4) may include the learned model 350.

This makes it possible to achieve effect comparable to the foregoing effect described in (4).

(6) The screen prediction device 400 may include the machine learning device 300.

This makes it possible to achieve effect comparable to the foregoing effect described in any one of (1) to (5).

(7) In the screen prediction device 400 described in (4), the learned model 350 may be provided in the server 500 connected to the screen prediction device 400 in a manner accessible from the screen prediction device 400 through the network 50.

This makes the learned model 350 applicable further to a machine tool 100, a controller 200, and a screen prediction device 400 newly mounted.

(8) The controller 200 of this disclosure includes the screen data loading unit 211 that loads screen data corresponding to the screen type data about the operation screen to be used next or on an occasion after the next by the user predicted by the screen prediction device 400.

The controller 200 limits data about a target operation screen to be loaded to data about the predicted operation screen, making it possible to minimize the volume of data about a screen to be loaded.

(9) The controller 200 described in (8) may include the screen prediction device 400. This makes it possible to achieve effect comparable to the foregoing effect described in (8).

EXPLANATION OF REFERENCE NUMERALS

100 Machine tool
200 Controller
211 Screen data loading unit
300 Machine learning device
311 State vector generation unit
312 State observation unit
314 Learning unit
350 Learned model
400 Screen prediction device
411 State acquisition unit
412 Prediction unit

What is claimed is:
1. A machine learning device comprising: a state observation unit that acquires a state vector sequence $\{x_n: n$ is equal to or greater than 1$\}$ that is time-series data as a group of state vectors $x_n$ corresponding to a transition of operation screens responsive to a series of operations by a user or change in a machine state of an industrial machine, the state vectors $x_n$ each containing screen type data $y_n$ and machine state data $z_n$, the screen type data $y_n$ indicating a screen type of each operation screen used by the user when the user performs the series of operations on the basis of an operation screen displayed on a display unit of a controller for controlling the industrial machine, the machine state data $z_n$ indicating the machine state of the industrial machine controlled by the controller when the operation screen is displayed;

a training data acquisition unit that acquires training data containing input data and label data, the input data being a subsequence of preset N (N is equal to or greater than 2) consecutive state vectors $\{x_n, x_{n+1}, \ldots x_{n+N-1}\}$ starting from an arbitrary state vector $x_n$ (n is equal to or greater than 1) belonging to the state vector sequence acquired by the state observation unit, the label data being screen type data about a screen to be displayed next or on an occasion after the next to the operation screen containing screen type data $y_{n+N-1}$ indicating the type of a screen to be displayed next to an operation screen corresponding to a state vector $x_{n+N-1}$ at the end of the state vector subsequence as the input data; and a learning unit that performs supervised machine learning using the training data containing the input data and the label data, when the user performs a series of operations on the basis of an operation screen displayed on the display unit, the learning unit generating a learned model for predicting screen type data to be used next or on an occasion after the next by the user on the basis of a state vector subsequence containing N consecutive state vectors determined retrospectively starting from a current state vector.

2. The machine learning device according to claim 1, wherein the learning unit performs machine learning on a flow of the series of operations using a recurrent neural network.

3. The machine learning device according to claim 2, wherein a long short-term memory (LSTM) as an RNN with an input gate, an output gate, and a forget gate is used as the recurrent neural network.

4. A screen prediction device configured using a learned model generated by the machine learning device according to claim 1, the screen prediction device comprising: a state acquisition unit that acquires a state vector subsequence $\{x_{n-N+1}, \ldots x_n\}$ containing N consecutive state vectors determined retrospectively starting from a current state vector $x_n$ (n is equal to or greater than N) relating to an operation screen responsive to a series of operations by a user; and a prediction unit that inputs the state vector subsequence $\{x_{n-N+1}, x_n\}$ acquired by the state acquisition unit to the learned model, and predicts screen type data about an operation screen to be used next or on an occasion after the next by the user.

5. The screen prediction device according to claim 4, further comprising a machine learning device, wherein the machine learning device comprises:

a state observation unit that acquires a state vector sequence $\{x_n: n \text{ is equal to or greater than } 1\}$ that is time-series data as a group of state vectors $x_n$ corresponding to a transition of operation screens responsive to a series of operations by a user or change in a machine state of an industrial machine, the state vectors $x_n$ each containing screen type data $y_n$ and machine state data $z_n$, the screen type data $y_n$ indicating a screen type of each operation screen used by the user when the user performs the series of operations on the basis of an operation screen displayed on a display unit of a controller for controlling the industrial machine, the machine state data $z_n$ indicating the machine state of the industrial machine controlled by the controller when the operation screen is displayed;

a training data acquisition unit that acquires training data containing input data and label data, the input data being a subsequence of preset N (N is equal to or greater than 2) consecutive state vectors $\{x_n, x_{n+1}, \ldots x_{n+N-1}\}$ starting from an arbitrary state vector $x_n$ (n is equal to or greater than 1) belonging to the state vector sequence acquired by the state observation unit, the label data being screen type data about a screen to be displayed next or on an occasion after the next to the operation screen containing screen type data $y_{n+N-1}$ indicating the type of a screen to be displayed next to an operation screen corresponding to a state vector $x_{n+N-1}$ at the end of the state vector subsequence as the input data; and a learning unit that performs supervised machine learning using the training data containing the input data and the label data, when the user performs a series of operations on the basis of an operation screen displayed on the display unit, the learning unit generating the learned model for predicting screen type data to be used next or on an occasion after the next by the user on the basis of a state vector subsequence containing N consecutive state vectors determined retrospectively starting from a current state vector.

6. The screen prediction device according to claim 4, wherein the learned model is provided in a server connected to the screen prediction device in a manner accessible from the screen prediction device through a network.

7. A controller comprising a screen data loading unit that loads screen data corresponding to the screen type data predicted by a screen prediction device configured using a learned model generated by the machine learning device according to claim 1, the screen type data being about an operation screen to be used next or on an occasion after the next by a user, wherein the screen prediction device comprises:

a state acquisition unit that acquires a state vector subsequence $\{x_{n-N+1}, \ldots x_n\}$ containing N consecutive state vectors determined retrospectively starting from a current state vector $x_n$ (n is equal to or greater than N) relating to an operation screen responsive to a series of operations by the user; and a prediction unit that inputs the state vector subsequence $\{x_{n-N+1}, \ldots x_n\}$ acquired by the state acquisition unit to the learned model, and predicts screen type data about the operation screen to be used next or on an occasion after the next by the user.

8. A controller comprising:

a screen prediction device configured using a learned model generated by the machine learning device according to claim 1; and a screen data loading unit that loads screen data corresponding to screen type data predicted by the screen prediction device, the screen type data being about an operation screen to be used next or on an occasion after the next by a user, wherein the screen prediction device comprises:

a state acquisition unit that acquires a state vector subsequence $\{x_{n-N+1}, \ldots x_n\}$ containing N consecutive state vectors determined retrospectively starting from a current state vector $x_n$ (n is equal to or greater than N) relating to an operation screen responsive to a series of operations by the user; and a prediction unit that inputs the state vector subsequence $\{x_{n-N+1}, x_n\}$ acquired by the state acquisition unit to the learned model, and predicts screen type data about the operation screen to be used next or on an occasion after the next by the user.

* * * * *